May 10, 1966     C. E. BATES     3,250,928
ALTERNATOR

Filed July 29, 1963     4 Sheets—Sheet 1

CHARLES E. BATES
INVENTOR.

BY John R. Faulkner
Keith L. Zerschling
ATTORNEYS

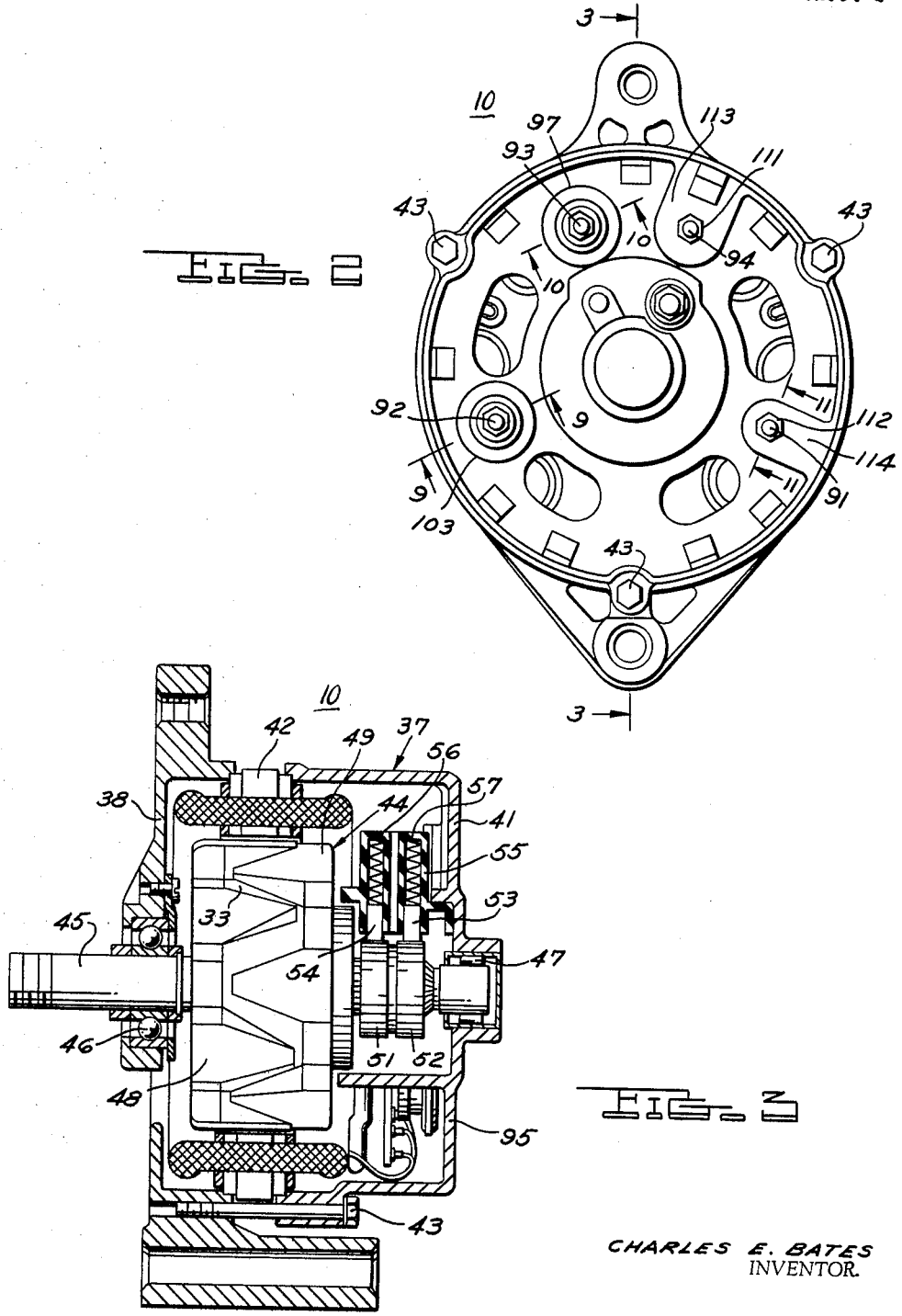

May 10, 1966  C. E. BATES  3,250,928
ALTERNATOR
Filed July 29, 1963  4 Sheets-Sheet 3
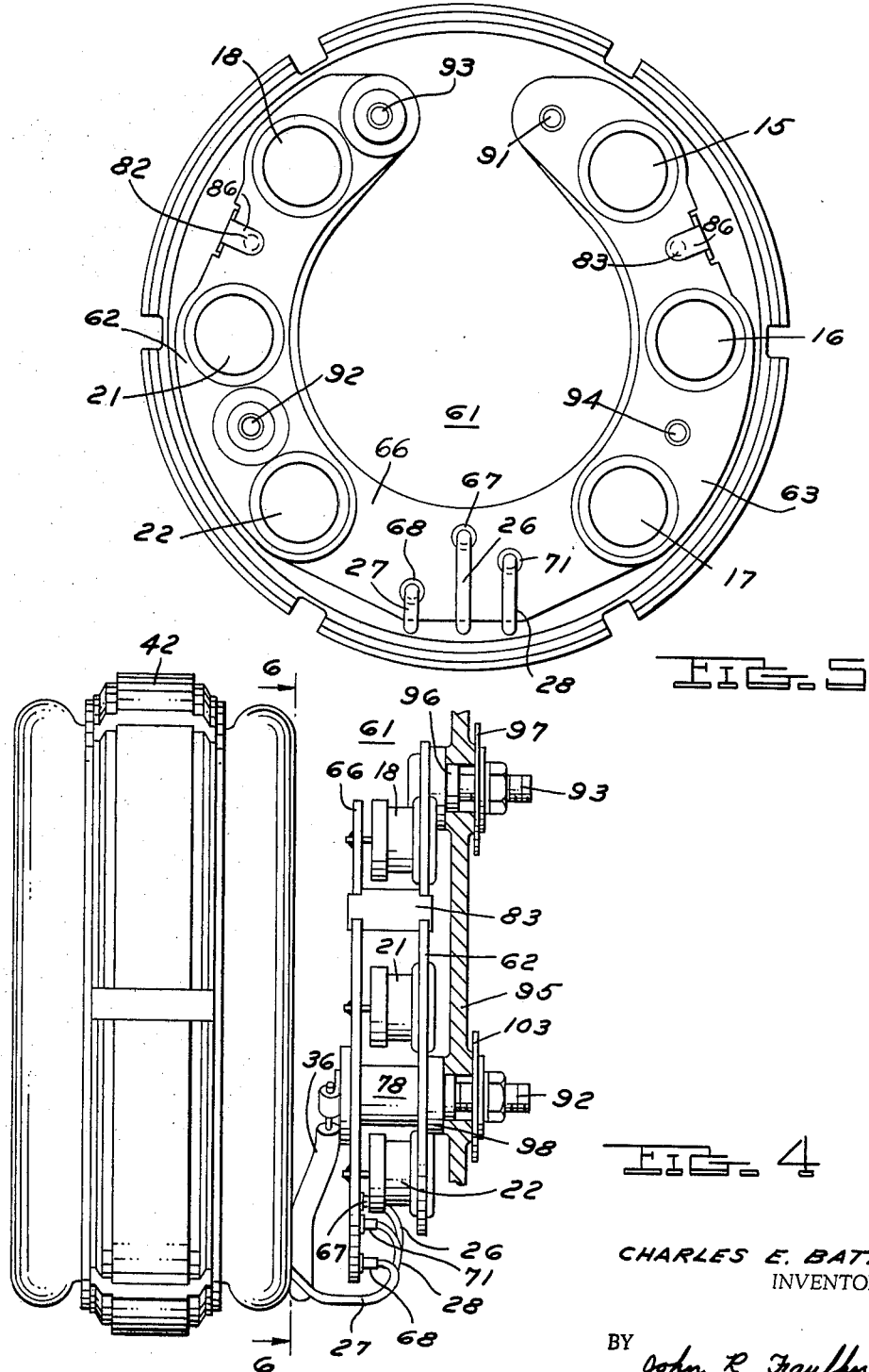
CHARLES E. BATES
INVENTOR.
BY John R. Faulkner
Keith L. Zerschling
ATTORNEYS May 10, 1966  C. E. BATES  3,250,928
ALTERNATOR Filed July 29, 1963

CHARLES E. BATES
INVENTOR.

BY John R. Faulkner
Keith L. Zerschling
ATTORNEYS

United States Patent Office 3,250,928
Patented May 10, 1966

3,250,928
ALTERNATOR
Charles E. Bates, Dearborn, Mich., assignor to The Ford Motor Company, Dearborn, Mich., a corporation of Delaware
Filed July 29, 1963, Ser. No. 298,173
8 Claims. (Cl. 310—68)

This invention relates to an alternator and more particularly to a rectifier mounting assembly for an alternator suitable for use in an automotive vehicle.

The alternator possesses several substantial advantages over the direct current type generator employed previously in conventional passenger automotive vehicle electrical systems. One advantage is a considerable weight reduction made possible with the alternator. For example, an alternator capable of supplying the needed electrical energy for a passenger car vehicle may weigh somewhere between eleven and thirteen pounds, while a comparable conventional direct current generator may weigh approximately twenty-three pounds. Thus, by using the alternator considerable savings can be made in the cost of copper and other materials used to construct such a machine.

The rotor of the alternator may be operated at much higher angular velocities than the armature of a direct current generator. The rotor of the alternator carries the field winding of the machine. Such a structure can withstand centrifugal forces of much higher magnitude than the armature windings and commutator of the direct current generator.

The direct current generator employs a mechanical rectification system comprised of a commutator mounted upon the rotary armature and a plurality of brushes contacting the armature. These brushes carry the output current of the generator, and for this reason are quite expensive. Considerable difficulty is also caused by sparking due to inductive reactance of the armature winding and by wear and contaminants interfering with the transfer of electrical energy between the brushes and the commutator. In the alternator, the field winding is mounted on the rotor. Thus, the electrical contact brushes carry only direct current of small magnitude. The armature windings of the alternator are mounted in the stator and a stationary rectifier must be employed to rectify the alternating current output of these windings.

The alternator and the rectifier should comprise a self-contained unit so that direct current is available at the output terminals of the machine. To accomplish this purpose, a full wave rectifier has been employed in commercial machines. For a three phase alternator, commonly employed, it is necessary to use six diodes connected to the armature windings to rectify the alternating current output of the alternator. Such a structure is shown in Patent 3,041,484, issued June 26, 1962 to J. E. Freer and A. J. Thibodeau and assigned to the assignee of this invention. This alternator, and others of similar design, have been found to be generally satisfactory for automotive applications. Some mechanical damage to the rectifiers and the leads may occur, however, due to vibrations found in an automotive vehicle that correspond to the natural frequency of vibration of the wires and diodes that form the rectifier assembly of the machine.

The present invention provides a rectifier assembly in which all of the leads and other mechanical elements are of short length. This provides a high natural frequency of vibration for any of the elements and this frequency of vibration is substantially above the frequency of vibration found in a standard automotive vehicle. To accomplish this purpose, a printed circuit board is employed to interconnect the armature windings and the diodes of the rectifier assembly that are mounted on a pair of arcuate plate members. The printed circuit board and the conductive plates supporting the diodes are supported from an end wall of the stator in spaced parallel relationship. The leads from the stator or armature windings are tied into the printed circuit board and the terminal leads from the diodes are also tied into the printed circuit board. The printed circuit board is rigidly supported from the end wall of the machine and the conductive plates to form a rigid structure that will substantially prevent damage due to vibrations below the natural frequency of the components of the system and that has a natural frequency of vibration higher than the vibrations commonly found in an automotive vehicle.

The rectifier assembly of this invention is also uncomplicated, easy to assemble, and it provides a compact structure that can be housed easily within the stator of the alternator.

An object of the invention is the provision of a rectifier assembly for an alternator.

Another object of the invention is the provision of a rectifier assembly particularly suited for use in an automotive vehicle alternator.

A further object of the invention is the provision of a rectifier assembly for an alternator that is simple, compact, and that can be positioned readily within the stator of an alternator.

Another object of the invention is the provision of a rectifier assembly for an automotive vehicle alternator that is particularly immune from damage caused by vibrations found in an automotive vehicle.

Other objects and attendant advantages of the invention will become more apparent as the specification is considered in connection with the attached drawings in which:

FIGURE 2 is an end view of the alternator;

FIGURE 4 is an elevational view of the armature winding structure and the rectifier assembly of the invention;

FIGURE 5 is an end view of the structure shown in FIGURE 4 without the portion of the end wall of the stator as shown in FIGURE 4;

FIGURE 9 is a sectional view taken along the lines 9—9 of FIGURE 2;

Figure 1:
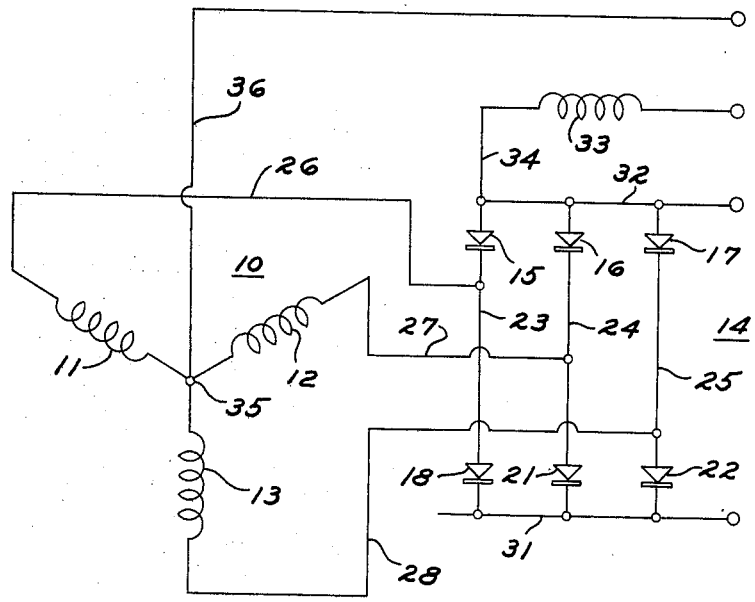
FIGURE 1 is a partial circuit diagram of the alternator of this invention.

Referring now to the drawings in which like reference numerals designate like parts throughout the several views thereof, there is shown in FIGURE 1 the electrical circuit diagram of the present invention in which the reference numeral 10 designates a three phase alternator including three armature windings 11, 12 and 13 connected in a conventional Y manner. The three armature windings 11, 12 and 13 are connected to a rectifier 14 composed of a plurality of diodes 15, 16, 17, 18, 21 and 22.

The diodes are arranged in two groups, each group containing three diodes. The positive terminal of diode 15 is connected to the negative terminal of diode 18 by a lead 23, the positive terminal of diode 16 is connected to the negative terminal of diode 21 by a lead 24, and the positive terminal of diode 17 is connected to the negative terminal of diode 22 by a lead 25. The end of armature winding 11 is connected to the lead 23 through a lead 26, the end of armature winding 12 is connected to lead 24 through a lead 27, and the end of armature winding 13 is connected to lead 25 through a lead 28. The leads 26 through 28 thus connect the armature or output windings 11, 12 and 13 of the alternator to the rectifier 14. The positive terminals of the diodes 18, 21 and 22 are connected to form the positive terminal 31 of the rectifier, and the negative terminals of the diodes 15, 16 and 17 are connected to form the negative terminal 32 of the rectifier.

The alternator 10 also includes a field winding 33 having one end thereof connected to the negative terminal 32 of the rectifier by means of a lead 34. The neutral point 35 of the armature windings is connected to a lead 36 that extends externally of the alternator. It is to be understood that an electrical storage battery and the electrical load of the vehicle (not shown) are connected across the positive and negative terminals 31 and 32 of the alternator. The lead 36 is connected to a voltage regulator (not shown) as is the other end of the field winding 33. This voltage regulator may be any of a number of commonly used voltage regulators employed in automotive vehicle generating systems, and it controls the energization of the field winding 33 in response to the output of one of the armature windings.

Figure 3:
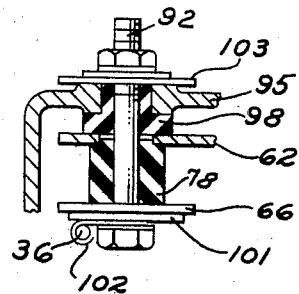
FIGURE 3 is a sectional view, partially in elevation, taken along the lines 3—3 of FIGURE 2.

Referring now to FIGURES 2 and 3, the alternator 10 includes a stator 37 formed of a front housing 38, a rear housing 41, and an intermediately disposed armature winding structure 42. The front housing 38, rear housing 41, and armature winding structure 42 are held together by a plurality of bolts 43.

The rotor 44 of the alternator 10 includes a shaft 45 that is rotatably supported within the stator 37 by means of a bearing 46 positioned in the front housing 38, and by means of a bearing 47 positioned in the rear housing 41. The rotor 44 carries the field winding 33 positioned radially inwardly from magnetic pole pieces 48 and 49. A pair of slip rings 51 and 52 are connected to the field winding 33 for purposes of energization, and the slip rings 51 and 52 are energized through electrical contact brushes 53 and 54 positioned in a brush holder 55. Springs 56 and 57 urge the electrical contact brushes 53 and 54 into engagement with slip rings 51 and 52. The connection of the field winding 33 to the slip rings 51 and 52, and the connections between the electrical contact brushes 53 and 54 and an external energizing circuit, are shown and described in my copending application S.N. 291,437, filed June 28, 1963, and assigned to the assignee of this invention.

The rectifier assembly 61 of the invention is shown specifically in FIGURES 4 through 8. It comprises a pair of conductive plates 62 and 63 formed in the shape of arcuate segments. The conductive plate 62 serves as the positive terminal 31 of the rectifier 14, while the conductive plate 63 serves as the negative terminal 32 of the rectifier 14. As can best be seen in FIGURE 8, each of the diodes comprises a conductive metal case 64 that serves as one terminal of the diode and a terminal lead 65 which serves as the other terminal of the diode. The diodes are suitably affixed to the conductive plates 62 and 63 by soldering. This figure shows diode 15 suitably soldered to the conductive plate 63. The soldering operation thus electrically connects the conductive metal cup or case 64 of the diodes to the conductive plates 62 or 63. It also provides a suitable path for the transfer of heat from the diodes to the plates 62 or 63. The conductive metal plates 62 and 63 serve not only as the positive and negative terminals 31 and 32 of the rectifier 14, but also as heat sinks for the diodes.

The diodes 15 through 18, 21 and 22 are preferably of the silicon P-N junction type. In diodes 15, 16 and 17, the case 64 serves as the negative terminal of each of the diodes and is in electrical contact with the "N" portion of the junction. The terminal lead 65 serves as the positive terminal of each of these diodes and is in electrical contact with the "P" material of the P-N junction. The reverse is true with respect to diodes 18, 21 and 22. In these diodes, the conductive metal cup or case 64 serves as the positive terminal of each of the diodes and the "P" type material of the P-N junction is in electrical contact with the case 64. The "N" type material of the P-N junction is in contact with the electrical terminal lead 65. The details of such a diode are more specifically shown in United States Patent 3,041,484, granted June 26, 1962 to J. R. Freer et al. and assigned to the assignee of this invention.

A printed circuit board 66 that is U or horseshoe shaped with two legs and an interconnecting intermediate portion is employed to connect the leads 26, 27 and 28, to the terminal leads 65 of the diodes 15 through 18, 21 and 22. For this purpose the printed circuit board has three eyelets 67, 68 and 71 positioned in the interconnecting middle portion, that are connected to leads 26, 27 and 28 respectively. These eyelets extend through the printed circuit board and are in electrical contact with the printed circuit as will be described subsequently. The conductive rectifier plates 62 and 63 are positioned opposite the legs of the U-shaped printed circuit board 66, and the legs have six spaced holes or apertures 72 through 77 for receiving the terminal leads 65 of the diodes 15 through 18, 21 and 22, respectively.

Figure 6:
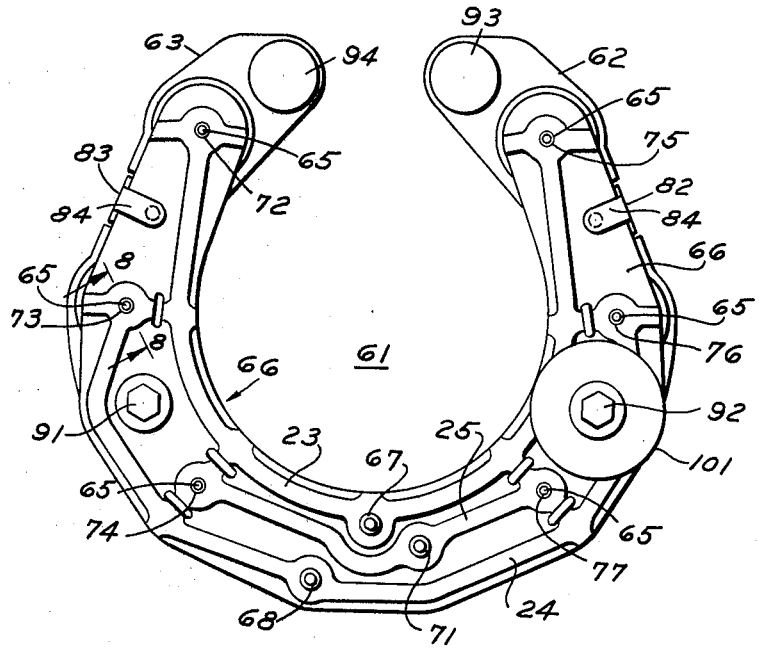
FIGURE 6 is a view of the rectifier assembly taken along the lines 6—6 of FIGURE 4.
Figure 7:
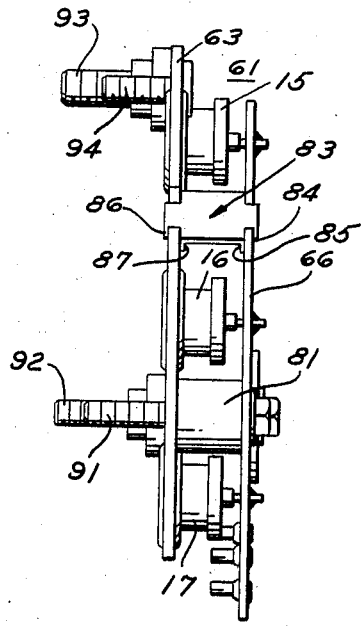
FIGURE 7 is a side elevational view of the rectifier assembly of the invention.
Figure 8:
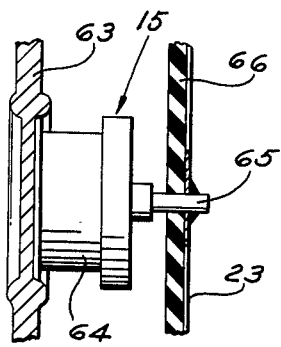
FIGURE 8 is a partial sectional view through a diode mounting plate and printed circuit board showing the diode in elevation.

As can best be seen by reference to FIGURES 4 and 6, the printed circuit is positioned on the side of the printed circuit board 66 adjacent the armature winding structure 42. The printed circuit comprises a printed lead that connects eyelet 67 with the terminal leads 65 of diodes 15 and 18. This printed circuit lead has been designated by the numeral 23 to correspond with the lead 23 in FIGURE 1. Similarly, the eyelet 68 is connected to the terminal leads 65 of diodes 16 and 21 through the printed circuit lead 24, and the eyelet 71 is connected to the terminals 65 of diodes 17 and 22 through the printed circuit lead 25.

The conductive plates 62 and 63 are positioned in a plane that is substantially parallel to the plane of the printed circuit board 66. The printed circuit board 66 and the conductive plates 62 and 63 are held in this position by means of a pair of spacers 78 and 81 made of a nonconductive material, and by means of a pair of spring clips 82 and 83. Each of the spring clips 82 and 83 has a pair of perpendicularly extending legs 84 and 85 positioned on either side of the printed circuit board 66, and a pair of perpendicularly extending legs 86 and 87 positioned on either side of the conductive plates 62 and 63. A pair of bolts 91 and 92 pass through the spacers 78 and 81 and serve as a means to affix the rectifier assembly to the stator of the machine. The conductive plate 62 also has a bolt 93 affixed thereto that serves as a means for supporting the rectifier assembly in the stator and also serves as the means for connecting the conductive plate 62 to the external circuit. Similarly, the conductive plate 63 has a bolt 94 that serves to ground the conductive plate 63 to the frame of the machine.

Figure 10:
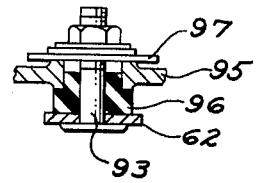
FIGURE 10 is a sectional view taken along the lines 10—10 of FIGURE 2.

The bolts 91, 92, 93 and 94 pass through an end wall 95 of the rear housing 41 of the stator 37. The end wall 95 lies in a plane substantially perpendicular to the axis of the rotor 44. The rectifier assembly is so supported by the bolts 91–94 that the printed circuit board 66 and the plates 62 and 63 lie in planes that are substantially parallel to the end wall 95 of rear housing 41. This is accomplished by positioning spacers 96 and 98 of insulating material between the conductive plate 62 and the end wall 95 of housing 41. This can be readily seen by inspection of FIGURES 4, 9 and 10. The bolt 93 also serves as the connection of the rectifier 14 to an external circuit, and for this purpose a washer of insulating material 97 is positioned adjacent the other side of the end wall 95 to insulate the bolt 93 from the end wall 95. As can be seen by reference to FIGURE 9, the bolt 92 also serves as a means for connecting the lead 36 from the neutral point 35 of the armature windings to an external circuit. For this purpose, an insulating washer 101 is laid over printed circuit board 66 and the lead 36 is connected to the bolt by means of clip 102. The bolt is insulated from the other side of the end wall 95 of the rear housing 41 by means of an insulating washer 103.

Figure 11:
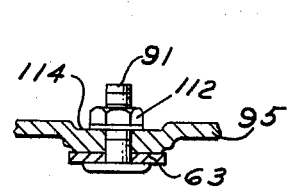
FIGURE 11 is a sectional view taken along the lines 11—11 of FIGURE 2.

By reference to FIGURES 2 and 11 it can be seen that bolts 91 and 94 on the conductive plate 63 are connected directly to the end wall 95 of the rear housing 41 by any suitable fastening means. For example, nuts 111 and 112 are used at indented portions 113 and 114 of the rear wall 95 to directly connect the conductive plate 63 that serves as the negative terminal 32 of the rectifier 14 to the rear housing 41. The rear wall is indented to compensate for the fact that spacers such as 96 and 98 are not used in this connection.

In constructing the rectifier assembly, the conductive plates 62 and 63 are held in a jig and the diodes 15 through 22 are positioned on the plates together with a ring of solder. The printed circuit board is then positioned on the diodes so that the leads 65 from the diodes extend through the apertures 72 through 77 in the printed circuit board. A block of solder is then positioned adjacent each of these leads. The spring clips 82 and 83 are then positioned in place as well as the spacers 81 and 78. This assembly is then passed through an oven in which an elevated temperature is maintained that permits the solder to melt and firmly solder the diodes to the plates 62 and 63, and the leads 65 of the diodes to the printed circuit leads 23 through 25 of the printed circuit board 66.

It can be understood that a rigid structure is provided for the rectifier assembly by means of the printed circuit board 66, the spacers 78 and 81, and the spring clips 82 and 83. The passing of the leads 65 of the diodes through the printed circuit board and the soldering of these leads to the printed leads 23, 24 and 25 offers additional rigidity.

The eyelets 67, 68 and 71 are positioned on the same side of the printed circuit board as the diodes 15 through 18, 21 and 22. Thus, the leads 26 through 28 from the stator windings 11, 12 and 13 can be conveniently curved underneath the printed circuit board 66 and properly positioned in the eyelets without severe bending. These leads are also kept short since the printed circuit board is positioned directly adjacent the armature windings. It can also be noted by reference to FIGURES 3 and 5 that the U-shaped printed circuit board 66 is positioned axially in the alternator so that it is around the periphery of the slip rings 51 and 52.

The present invention thus provides a compact, rigid and rugged rectifier assembly structure for an alternator suitable for use in an automotive vehicle. All of the leads in the structure and to the structure from the armature windings are short so that the natural frequency of vibration of these leads is much higher than the normal vibration frequencies encountered in automotive vehicles. Similarly, the structure is securely supported and tied together at relatively short spaced points so that the natural frequency of vibration of any of the components in the system is kept high.

It will be understood that the present invention is not to be limited to the exact construction shown and described, but that various changes and modifications may be made without departing from the spirit and scope of the invention as defined in the appended claims.

I claim:
1. In an alternator, an armature winding, a rectifier assembly connected to said armature winding, said rectifier assembly comprising a plurality of diodes, a pair of electrical conductive members, at least one of said diodes mounted on one of said members, the remainder of said diodes mounted on the other of said members and a printed circuit board having printed circuitry electrically interconnecting said armature winding and the diodes mounted on said members, one of said members comprising a plate, said printed circuit board being disposed in a plane parallel to said plate, and means fastening said printed circuit board to said plate.

2. In an alternator, an armature winding, a rectifier assembly connected to said armature winding, said rectifier assembly comprising a plurality of diodes, a pair of electrical conductive members, at least one of said diodes mounted on one of said members, the remainder of said diodes mounted on the other of said members, said diodes having terminal leads extending substantially perpendicularly to said members, a printed circuit board having printed circuitry electrically connected to said armature winding, said printed circuitry positioned on the side opposite said conductive members, one of said members comprising a plate, said printed circuit board being disposed in a plane parallel to said plate, means fastening said printed circuit board to said plate, said terminal leads of said diodes extending through said printed circuit board and electrically connected to said printed circuitry.

3. In an alternator, a stator having an end wall, a plurality of armature windings supported by said stator, a rectifier assembly connected to said armature windings, said rectifier assembly comprising a plurality of diodes, a first electrical conductive plate, a second electrical conductive plate, said diodes being divided into a first group supported on said first plate, and a second group supported on said second plate, a printed circuit board having printed circuitry positioned on the side opposite said conductive plates and said diodes, said armature windings connected to said printed circuitry, said first and said second conductive plates being positioned in a plane, said printed circuit board being disposed in a plane parallel to said conductive plates, means fastening said printed circuit board to said conductive plates, said diodes each having terminal leads extending in a direction substantially perpendicularly to said conductive plates and said printed circuit board, said terminal leads of said diodes extending through said printed circuit board and electrically connected to said printed circuitry, and means for securing said conductive plates and said printed circuit board to the end wall of said stator in substantially parallel relationship to said end wall.

4. In an alternator, a stator, said stator including a plurality of armature windings, a rotor rotatably mounted in said stator, said rotor including a field winding and a pair of slip rings connected to said field winding, said stator having an end wall positioned in a plane substantially perpendicular to the axis of said rotor, a rectifier assembly supported by the end wall of said housing, said rectifier assembly comprising a printed circuit board positioned around the periphery of said slip rings, a pair of flat conductive plates formed of arcuate segments and positioned in a plane substantially parallel to the plane of said printed circuit board, fastening means coupled to said pair of flat conductive plates, said printed circuit board and the end wall of said stator for supporting said printed circuit board and said pair of flat conductive plates in planes substantially parallel to the end wall of said stator, a plurality of diodes affixed to said flat conductive plates and having terminals connected to said printed circuit board, said flat conductive plates being of less arcuate extent than said printed circuit board, and leads from said armature winding connected to said printed circuit board in the area not covered by said flat conductive plates.

5. In an alternator, a stator, said stator including a housing and an armature winding, a rotor rotatably mounted in said stator, said rotor including a field winding and a pair of slip rings connected to said field windings, said housing having an end wall positioned in a plane substantially perpendicular to the axis of said rotor, a rectifier assembly supported by the end wall of said housing, said rectifier assembly comprising a printed circuit board positioned around the periphery of said slip rings and closely adjacent said armature windings, a pair of flat conductive plates formed of arcuate segments, and positioned in a plane substantially parallel to the plane of said printed circuit board, fastening means coupled to said pair of flat conductive plates, said printed circuit board and the end wall of said housing for supporting said printed circuit board and said pair of flat conductive plates in planes substantially parallel to the end wall of said housing, a plurality of diodes affixed to said flat conductive plates and having terminal leads extending substantially in a perpendicular direction with respect to said flat conductive plates and said printed circuit board, said flat conductive plates being of less arcuate extent than said printed circuit board, said printed circuit board having printed circuitry positioned thereon on the side adjacent said armature windings and opposite said flat conductive plates and diodes, said terminal leads of said diodes extending through said printed circuit board and electrically connected to said printed circuitry, and leads from said armature winding connected to said printed circuit board in the area not covered by said flat conductive plates.

6. In an alternator, a stator, said stator including a housing and an armature winding, a rotor rotatably mounted in said stator, said rotor including a field winding and a pair of slip rings connected to said field windings, said housing having an end wall positioned in a plane substantially perpendicular to the axis of said rotor, a rectifier assembly supported by the end wall of said housing, said rectifier assembly comprising a U-shaped printed circuit board having a pair of legs and an interconnecting middle portion positioned around the periphery of said slip rings, a pair of flat conductive plates formed of arcuate segments and positioned in a plane substantially parallel to the plane of said printed circuit board, fastening means coupled to said pair of flat conductive plates, said printed circuit board and the end wall of said housing for supporting said printed circuit board and said pair of flat conductive plates in planes substantially parallel to the end wall of said housing, with one of said flat conductive plates being positioned opposite one of the legs of said U-shaped printed circuit board and the other of said flat conductive plates being positioned opposite the other leg of said U-shaped printed circuit board, a plurality of diodes affixed to said flat conductive plates and having terminal leads extending substantially in a perpendicular direction with respect to said flat conductive plates and said printed circuit board, said flat conductive plates being of less arcuate extent than said printed circuit board, said printed circuit board having printed circuitry positioned thereon on the side adjacent said armature windings and opposite said flat conductive plates and diodes, said terminal leads of said diodes extending through said printed circuit board and electrically connected to said printed circuitry, and leads from said armature winding connected to said U-shaped printed circuit board at the intermediate middle portion thereof that interconnects said pair of legs.

7. In an alternator, a stator, a three phase armature winding supported by said stator, a full wave rectifier connected to said three phase armature winding, said rectifier comprising six diodes with each diode including an outer conductive case serving as one terminal and a lead insulated from said outer conductive case serving as the other terminal, three of said diodes forming a first group, the conductive cases of said diodes in said first group being the negative terminals and the leads being the positive terminals, the remainder of said diodes forming a second group, the conductive cases of the diodes in said second group being the positive terminals and the leads being the negative terminals, a pair of conductive rectifier plates, said conductive cases of said diodes in said first group being connected to one of said conductive rectifier plates, said conductive cases of said diodes in said second group being connected to the other of said conductive rectifier plates, said conductive rectifier plates lying in substantially the same plane, a printed circuit board, means fastening said printed circuit board to said conductive rectifier plates in spaced parallel relationship, said printed circuit board having printed circuitry positioned on a face opposite the conductive rectifier plates, said leads on said diodes extending through said printed circuit board and connected to said printed circuitry, said three phase armature winding having three leads connected to said printed circuitry, said printed circuitry including electrical conductive means for connecting each of said last mentioned leads with one diode carried by one of said conductive rectifier plates and one diode carried by the other of said conductive rectifier plates.

8. In an alternator, a stator having an end wall, a three phase armature winding supported by said stator, a full wave rectifier connected to said three phase armature winding, said rectifier comprising six diodes with each diode including an outer conductive case serving as one terminal and a lead insulated from said outer conductive case serving as the other terminal, three of said diodes forming a first group, the conductive cases of said diodes in said first group being the negative terminals and the leads being the positive terminals, the remainder of said diodes forming a second group, the conductive cases of the diodes in said second group being the positive terminals and the leads being the negative terminals, a pair of conductive rectifier plates, said conductive cases of said diodes in said first group being supported by and electrically connected to one of said conductive rectifier plates, said conductive cases of said diodes in said second group being supported by and electrically connected to the other of said conductive rectifier plates, said conductive rectifier plates lying in substantially the same plane, a printed circuit board, means fastening said printed circuit board to said conductive rectifier plates in spaced parallel relationship, said printed circuit board having printed circuitry positioned on a face opposite the conductive rectifier plates, said leads on said diodes extending through said printed circuit board and connected to said printed circuitry, said three phase armature winding having three leads connected to said printed circuitry, said printed circuitry including electrical conductive means for connecting each of said last mentioned leads with one diode carried by one of said plates and one diode carried by the other of said plates, and means connected to said conductive rectifier plates and the end wall of said stator for supporting said conductive rectifier plates and said printed circuit board in parallel relationship from the end wall of said stator.

References Cited by the Examiner
UNITED STATES PATENTS 2,934,662  4/1960  Robinson _____ 310—68.4
3,041,484  6/1962  Freer et al. _____ 310—68

MILTON O. HIRSHFIELD, *Primary Examiner.*

L. L. SMITH, *Assistant Examiner.*